(No Model.)

B. C. SHAW.
COMPARTMENT TANK.

No. 349,528. Patented Sept. 21, 1886.

Fig. 3ª. Fig. 3ᵇ.

WITNESSES.
Jacob W. Loeper
H. G. Sturm

INVENTOR.
Benjamin C. Shaw.
By C. P. Jacobs
Atty.

UNITED STATES PATENT OFFICE.

BENJAMIN C. SHAW, OF RACINE, WISCONSIN.

COMPARTMENT-TANK.

SPECIFICATION forming part of Letters Patent No. 349,528, dated September 21, 1886.

Application filed July 3, 1885. Serial No. 170,661. (No model.)

*To all whom it may concern:*

Be it known that I, BENJAMIN C. SHAW, a resident of Racine, Wisconsin, have made certain new and useful Improvements in Compartment-Tanks, a description of which is set forth in the following specification, reference being made to the accompanying drawings, in the several figures of which like letters indicate like parts.

My invention consists of a portable tank divided into separate compartments, provided with internal discharge-pipes leading separately from the several compartments to a measure-box attached to the rear end of the tank, which is mounted upon a suitable truck, inside of which measure-box faucets are attached to each of the several discharge-pipes, and will be understood from the following description.

Figure 1:
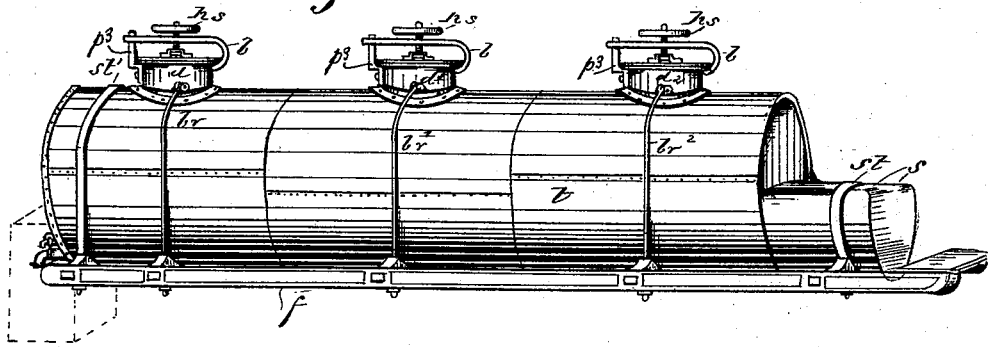
Figure 3:
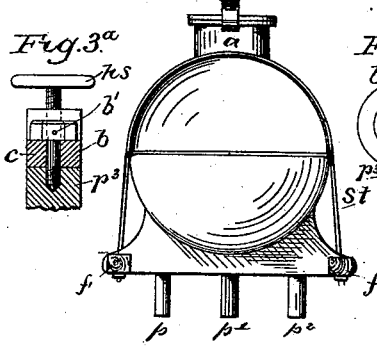

In the drawings, Figure 1 represents a side view of a three-compartment tank and its supporting-frame, the measure-box shown in dotted lines at the rear, the frame adapted to be mounted on any suitable truck for transportation. The front head of the tank rises to one-half the height of the tank, then runs back horizontally with a convex curve to sufficient depth to make room for a wagon-seat for the driver, then rises with a concave curve perpendicular to the top of the tank, as shown, the portion adapted to receive the seat being marked $s$. $d$, $d'$, and $d^2$ are domes connected by suitable collars to the top of the tank, opening inside each compartment. These domes are closed by covers, with each of which is connected a hand-screw, $hs$, passing through a curved brace, $b$, into a suitable nut connected with the cover, and this curved brace is hinged by means of a bolt passing through collar $c$ upon a projection, $p^3$, rising in the rear of the dome and bolted to it, as shown in Fig. 3, the foot of this brace $b$ curving under the front of the flanged top of the dome, as shown in Fig. 1. By means of this screw the cover may be raised from the opening of the dome and readily removed, the brace $b$ acting as a sort of crane to swing the cover around on a pivot, completely uncovering the whole mouth, for the convenience of filling each compartment of the tank.

Figure 2:
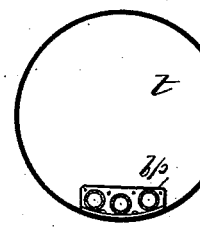
Figure 4:
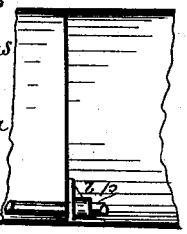
Figure 5:
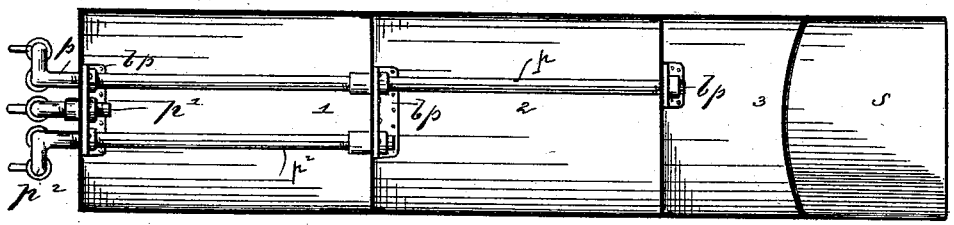

In Fig. 2 is shown a cross-section of the tank $t$, showing the form of the rear brace-plate $bp$, having three openings, through which the several discharge-pipes pass. Fig. 3 is a front view showing the elevation of the seat and the front strap, $st$, which, passing over the seat-step and down through the sides of the frame, is secured on the under side thereof by means of nuts, and assists in preventing the rolling of the tank in its cradle. Fig. $3^a$ is a sectional view of the pivot of the curved brace. Fig. $3^b$ is a plan view of one of the domes on a reduced scale. Fig. 4 is a vertical section of a portion of the tank, showing the front brace-plate secured at the bottom of the tank upon the forward side of the front partition. Fig. 5 is a longitudinal section of the entire tank, showing the back of the seat, the three compartments 1, 2, and 3, separated by the two central partitions, and the several brace-plates $bp$ in place, each one riveted and soldered to the bottom of the tank and to the side of the partition, against which it rests. These brace-plates are curved upon the bottom, so as to fit the concave surface of the tank below, and are formed flat on the sides, so as to rest against the flat partitions. Threaded openings are formed in these brace-plates, as shown in Fig. 2, the front one having one opening, the central one two openings, and the rear one three openings. The pipe $p$, which passes from the forward compartment, is screwed into the opening in the brace-plate $bp$ through an opening in the front partition, passes through an opening into the next brace-plate, and through the second partition, and through the rear brace-plate, and terminates in an elbow-joint connected with a faucet, as shown in Fig. 5. The pipe $p^2$ is connected with the brace-plate on the inside of the compartment 2, passes through that and the brace-plate in the rear, and there terminates in an elbow-joint, with which the faucet is connected. This serves to discharge the oil from the compartment 2 as pipe $p$ serves to discharge the oil from the compartment 3, while from compartment 1 the short pipe $p'$ leads directly through the rear brace-plate, terminating in a faucet between pipes $p$ and $p^2$. On the inside of compartment 1 and against the partition which separates compartments 1 and 2 threaded couplings are screwed upon the ends of pipes $p$ and $p^2$, to form a more perfect joint, preventing leakage. These couplings, after being screwed onto the pipes mentioned, may also be soldered, if desired, to make them more secure against any possible leakage of oil from one compartment into another.

The tank complete is placed upon a wooden frame composed of parallel side sills, $f$, with cross-sills running under and into the curves cut out of the top sides of these cross-sills, of the same arc as the tank. The tank is placed in the cradle thus formed and combined solidly therewith by means, first, of the strap $st$, made in suitable form, with the flat part of the top resting on and running across the tank under the seat, and to which the seat is attached, the ends of this strap running down through the wooden frame, with washer and screw-nuts drawing against the under side thereof. This fastens the forward end of the tank to the frame solidly, and prevents the tank from rocking in the cradle. From one or more of the domes on top of the tank are brace-rods $br$, $br'$, and $br^2$, hinged to a collar encircling the dome, running down on either side of the tank through the cross-sills of the frame, and secured on the under side thereof by means of screw-nuts, as shown in Fig. 1. In the rear the strap $st'$, passing over the tank and down on either side, stirrup-shaped, passes through the rear cross-sill, and is secured on the under side thereof by means of screw-nuts. These several brace-rods and straps hold the tank firmly to the frame and in its cradle, and secure it absolutely against twisting or wrenching in its joints, causing leakage of the fluids. The cradle-frame is attached to the truck-gearing by means of riser-blocks in the usual manner.

I am aware that compartment-tanks mounted on truck-gearings are not new, and do not broadly claim the same as my invention.

What I do claim as my invention, and desire to secure by Letters Patent, is the following:

1. The tank $t$, having its front head made in one piece of metal rising perpendicular to the height desired for the seat, thence passing backward in a horizontal line a sufficient depth, thence by a turn to a perpendicular, and attached with rivets, substantially as described.

2. The tank $t$, having two or more compartments with internal pipes leading therefrom and provided with inside brace-plates, $bp$, through which the discharge-pipes pass, substantially as described.

3. A portable compartment-tank having its front portion cut away to receive the seat for the driver, provided with domes to each compartment having movable covers secured by hand-screws $hs$, adapted to be swung around upon a curved brace, $b$, substantially as described.

4. In a portable compartment-tank, its front portion cut away to receive the seat of the driver, the compartments 1, 2, and 3, each provided with its separate dome and a separate internal discharge-pipe, the latter passing through the brace-plates $bp$, bolted to the inside of the tank and against the wall of each compartment, the whole set in a wooden cradle, as shown, and connected thereto by means of brace-rods and straps, and mounted upon a suitable truck for transportation, all combined substantially as described.

In witness whereof I have hereunto set my hand this 23d day of June, 1885.

BENJAMIN C. SHAW.

Witnesses:
   FREDERICK ROBINSON, Jr.,
   OLIVER VANORMAN.